United States Patent
Jol et al.

(10) Patent No.: US 9,475,222 B2
(45) Date of Patent: Oct. 25, 2016

(54) METHOD FOR FORMING INJECTION-MOLDED RECEPTACLE CONNECTOR

(75) Inventors: Eric S. Jol, San Jose, CA (US); Shayan Malek, San Jose, CA (US); Warren Z. Jones, San Jose, CA (US)

(73) Assignee: Apple Inc., Cupertino, CA (US)

( * ) Notice: Subject to any disclaimer, the term of this patent is extended or adjusted under 35 U.S.C. 154(b) by 948 days.

(21) Appl. No.: 13/587,504

(22) Filed: Aug. 16, 2012

(65) Prior Publication Data
US 2014/0051301 A1  Feb. 20, 2014

(51) Int. Cl.
  *B29C 45/00* (2006.01)
  *H01R 43/18* (2006.01)

(52) U.S. Cl.
  CPC ....... *B29C 45/0025* (2013.01); *B29C 45/0046* (2013.01); *H01R 43/18* (2013.01); *B29C 2045/0058* (2013.01)

(58) Field of Classification Search
  CPC .......... B29C 45/0025; B29C 45/0046; B29C 2045/0058; H01R 43/18; Y10T 29/49227; Y10T 29/49147
  See application file for complete search history.

(56) References Cited

U.S. PATENT DOCUMENTS

| | | | |
|---|---|---|---|
| 4,442,055 A * | 4/1984 | Oelsch | B29C 70/74 264/105 |
| 5,538,413 A * | 7/1996 | Gardner et al. | 425/145 |
| 8,105,108 B2 * | 1/2012 | Vroom et al. | 439/540.1 |
| 2003/0001297 A1 * | 1/2003 | Suematsu | B29C 45/0046 264/1.25 |
| 2012/0242000 A1 * | 9/2012 | Komatsu | B29C 45/0025 264/272.11 |

* cited by examiner

*Primary Examiner* — Livius R Cazan
(74) *Attorney, Agent, or Firm* — Downey Brand LLP

(57) ABSTRACT

A method of forming a part includes uni-directionally injecting a mold with material to form a molded part, removing the molded part from the mold, and forming at least one cavity in the molded part, the at least one cavity being defined by a machining process separate from a molding process.

15 Claims, 7 Drawing Sheets

METHOD FOR FORMING INJECTION-MOLDED RECEPTACLE CONNECTOR

FIELD OF THE DESCRIBED EMBODIMENTS

The described embodiments relate generally to injection molded parts, and more particularly, to uni-directionally injection molded parts.

BACKGROUND

Conventionally, injection molding processes employ a mold with two or more gate regions arranged to receive molten material for molding into a part. Molten material is injected into the two or more gate regions, flowed through a molding cavity, and cooled to form the part. The molten material, prior to cooling, meets at an interface between two or more flow directions and forms a knit line, or weld line. The knit line causes locally weak areas prone to breakage or failure of a molded part.

For example, as illustrated in FIG. 1, a conventionally molded part 100 includes a knit line 101 extended throughout the entire part 100 formed from two flow fronts flowing in opposite directions 102 and 103 through gate regions 121 and 131, respectively. The knit line 101 may cause total failure of the part 100 if, for example, force is applied within cavity 104.

Therefore, what is needed is an enhanced injection molded process by which knit line weakness can be reduced or eliminated entirely.

SUMMARY OF THE DESCRIBED EMBODIMENTS

This paper describes various embodiments that relate to injection molding of parts.

According to an embodiment of the invention, a method of forming a part includes uni-directionally injecting a mold with material to form a molded part, removing the molded part from the mold, and forming at least one cavity in the molded part, the at least one cavity being defined by a machining process separate from a molding process.

According to an additional embodiment of the invention, a method of forming a part includes preparing a mold cavity to receive material, flowing material through the mold cavity in a single primary direction to form a molded part, removing the molded part from the mold cavity, and forming at least one cavity in the molded part, the at least one cavity being defined by a machining process.

According to an additional embodiment of the invention, a seamless part includes a main body formed through a molding process and at least one cavity arranged in the main body defined by a machining process.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
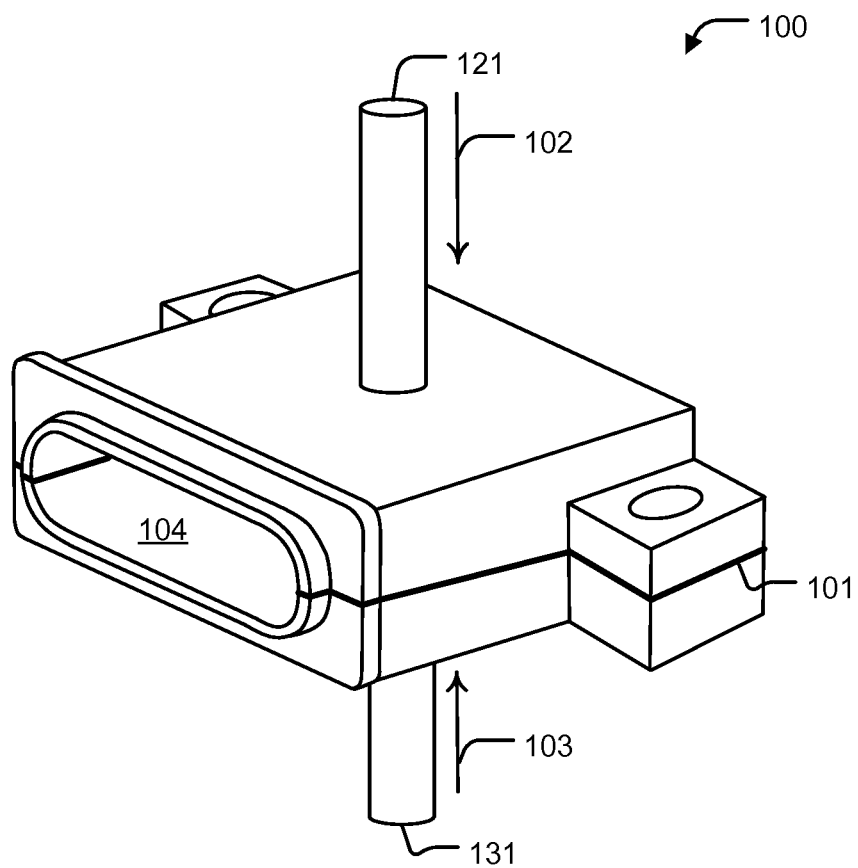
FIG. 1 is a perspective view of a conventionally injection molded part.
Figure 2A:
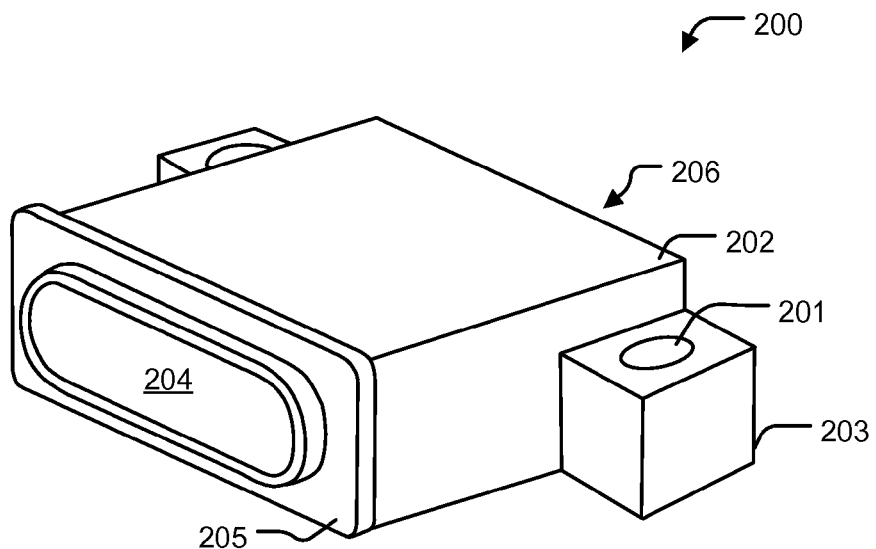
FIG. 2A is a perspective view of a uni-directionally injection molded part, according to an embodiment of the invention.
Figure 2B:
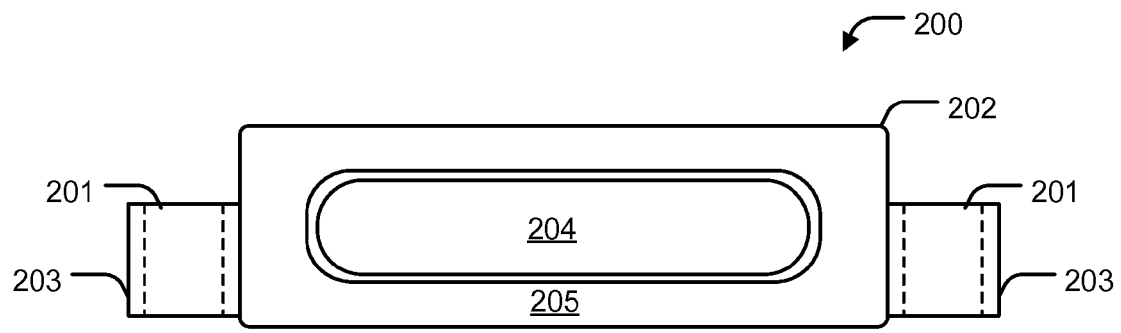
FIG. 2B is an elevation view of the uni-directionally injection molded part of FIG. 2A.

Turning to FIGS. 2A-2B, a perspective view and elevation view of a uni-directionally injection molded part are illustrated, according to an embodiment of the invention. The part 200 includes a main body 202 and fastener receiving protrusions 203 arranged on the main body 202. The fastener receiving protrusions 203 may include through holes 201 arranged therethrough configured to receive a suitable fastener, such as, for example, a bolt, screw, clip, or other fastener. Although particularly illustrated as protrusions, it should be understood that the same may be varied in many ways, or omitted depending upon any desired implementation of the invention. Furthermore, the through holes 201 may be formed through injection molding, or may alternatively be formed through a machining process after molding of the part 200.

The main body may have a cavity 204 formed therein exposed through at least one primary surface 205 of the part 200. The cavity 204 may extend entirely through the main body 202 thereby forming a channel by which to support electrical connections in at least one embodiment. In other embodiments the main body 202 may include a through hole arranged to pass electrical connections from the internal cavity 204 to an opposing primary surface 206 opposite the at least one primary surface 205. The cavity 204 may be a machined cavity defined by a machining process separate from a molding process.

The electrical connections which may be arranged in cavity 204 may include at least one electrode configured to severably connect to a complementary plug or device connection inserted into the cavity 204. Therefore, the part 200 may be considered a receptacle configured to mate to a severable plug configured to engage with cavity 204. As illustrated, the part 200 lacks any discernable knit line, is a seamless part, and is considerably more durable than part 100. Therefore, if a plug is inserted and engaged with cavity 204, the part 200 resists breakage due to insertion forces, is relatively stiff if the engaged plug is twisted, and may be longer-lasting than the part 100 during several re-connect cycles.

The lack of a knit line in part 200 is facilitated through a uni-directional injection molding process combined with a machining process by which opposing flows of material through a mold are eliminated or reduced as compared to convention processes. Hereinafter, methods of forming a part through injection molding are described in detail.

Figure 3:
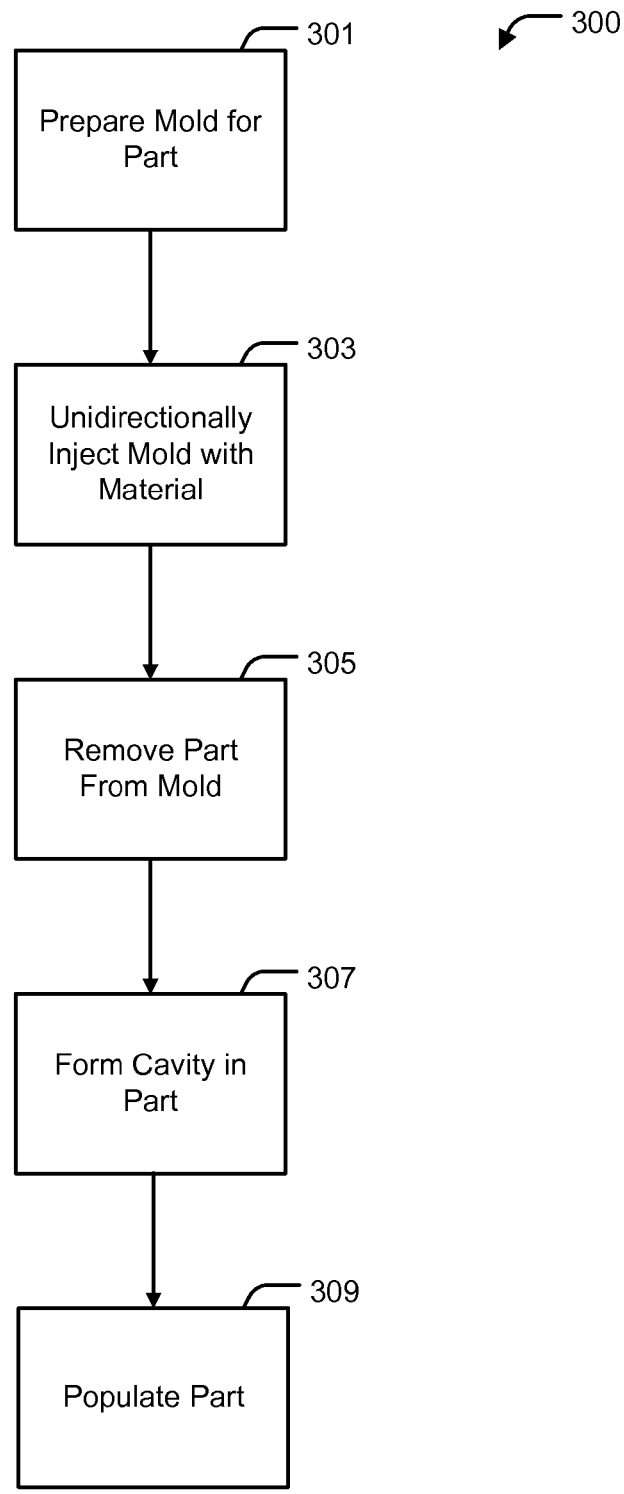
FIG. 3 is a method of forming a part, according to an embodiment of the invention.

FIG. 3 is a method 300 of forming a part, according to an embodiment of the invention. The method 300 includes preparing a mold for a part at block 301. Preparing the mold may include cleaning the mold, preparing mold surfaces (e.g., lubrication, sealing, polishing, etc), clamping one or more mold bodies together to form a mold cavity, preparing a mold cavity to receive material, and/or any other suitable preparatory processes.

The method 300 further includes uni-directionally injecting the prepared mold with material at block 303. Uni-directionally injecting the prepared mold includes injecting material into the mold such that one primary flow front is formed, thereby mitigating risk of forming a knit line. Material is therefore flowed into a mold cavity in a single primary direction. The uni-directional injecting is facilitated by a single gate region arranged at one primary internal surface of the mold cavity. The primary internal surface of the mold cavity is a major surface defining an outer surface of an injection molded part, and is described more fully below with reference to FIGS. 4-7.

The material injected may include any suitable material in a liquid or partially liquid form, for example, plastic, thermoplastic, metal, amorphous metal, or any other desired material. The material may cool and harden, thereby forming a part.

The method 300 further includes removing the molded part from the mold or mold cavity at block 305. For example, mold bodies may be separated to gain access to an interior of the mold (e.g., the mold cavity), and the part removed. Removal may be facilitated through application of compressed air, agitation of the mold, or by any suitable mechanism.

The method 300 further includes forming a cavity in the molded part at block 307. For example, a cavity similar to cavity 204 may be defined by a machining process by which portions of material are removed. The machining process may include any suitable machining process, including computer-controlled machining processes and other automated processes. Lathes, drills, computer numerical control (CNC) machines, or other suitable tools may be used in this process.

Upon forming the cavity and any other preparatory steps, the part may be populated with electrical connections (e.g., if a receptacle) at block 309, and/or may be used in assembly of a personal electronic device or other assembly process. Other preparatory steps may include removal of gate region remnants, formation of fastener receiving through holes similar to holes 201 (e.g., if not formed through injection molding), cleaning, polishing, inspection, or other suitable preparatory steps.

As described above, material is uni-directionally injected into a mold cavity to form the part 200, which limits, reduces, or eliminates the possibility of multiple flow fronts forming a knit line, thereby resulting in a durable and seamless part. Hereinafter, several examples of gate regions on injection molded parts not yet machined are described with reference to FIGS. 4-7

Figure 4:
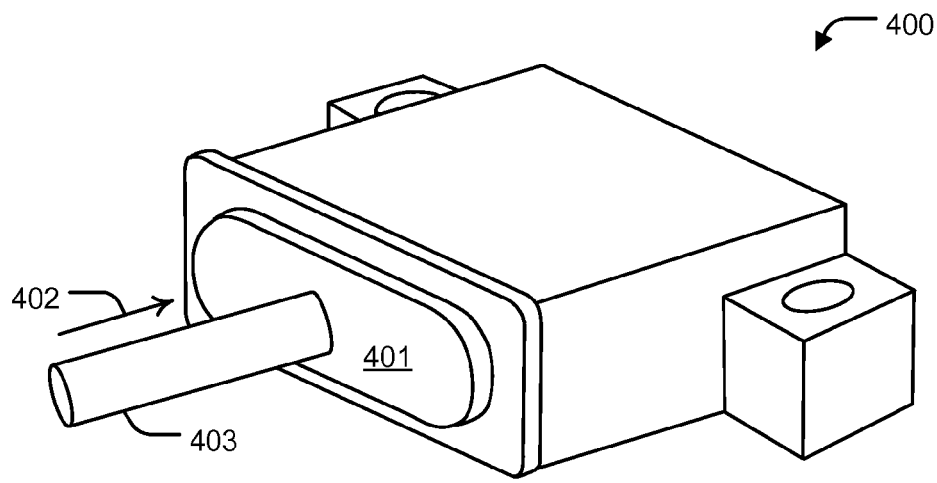
FIG. 4 is a perspective view of a uni-directionally injection molded part, according to an embodiment of the invention.

FIG. 4 is a perspective view of an injection molded part 400, according to an embodiment of the invention. As illustrated, the part 400 lacks a knit line. Furthermore, the part 400 is formed through a single gate region 403 proximate a primary surface 401 of the part 400 using a single primary flow direction 402. The primary flow direction 402 is the overall flow direction of injected material which formed the part 400. The primary flow direction 402 may be substantially orthogonal to the primary surface 401, or may be angled therefrom. The gate region 403 may remain attached to the part 400 after removal from a mold (e.g., as a remnant), and may be removed prior to or during machining processes. Generally, fiber orientation of cooled material (e.g., if using molten plastic as an injection material) will be substantially parallel to the primary flow direction 402, and thus differing rigidity and stiffness characteristics may be achieved through altering the flow direction to be substantially orthogonal to a different surface than that illustrated. As such, any primary surface of a part may be used in choosing a primary flow direction, with several examples presented below.

Figure 5:
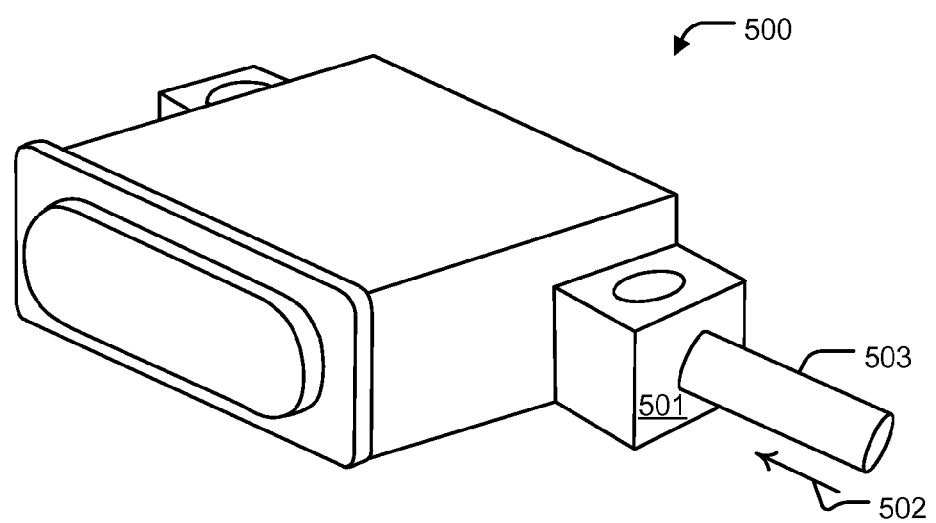
FIG. 5 is a perspective view of a uni-directionally injection molded part, according to an embodiment of the invention.

FIG. 5 is a perspective view of an injection molded part, according to an embodiment of the invention. As illustrated, the part 500 lacks a knit line. Furthermore, the part 500 is formed through a single gate region 503 proximate a primary surface 501 of the part 500 using a single primary flow direction 502. The primary flow direction 502 is the overall flow direction of injected material which formed the part 500, and differs from direction 402. The primary flow direction 502 may be substantially orthogonal to the primary surface 501, or may be angled therefrom. The gate region 503 may remain attached to the part 500 after removal from a mold (e.g., as a remnant), and may be removed prior to or during machining processes. Generally, fiber orientation of the part 500 will be substantially orthogonal to fiber direction of the part 400 (e.g., if using molten plastic as an injection material). This may afford differing stiffness and rigidity characteristics, and may prove useful in deciding primary flow directions for parts depending upon cavity orientation or predicted internal stresses for a final part. Flow directions may also be chosen opposite to directions 402 and 502, as illustrated in FIGS. 6 and 7.

Figure 6:
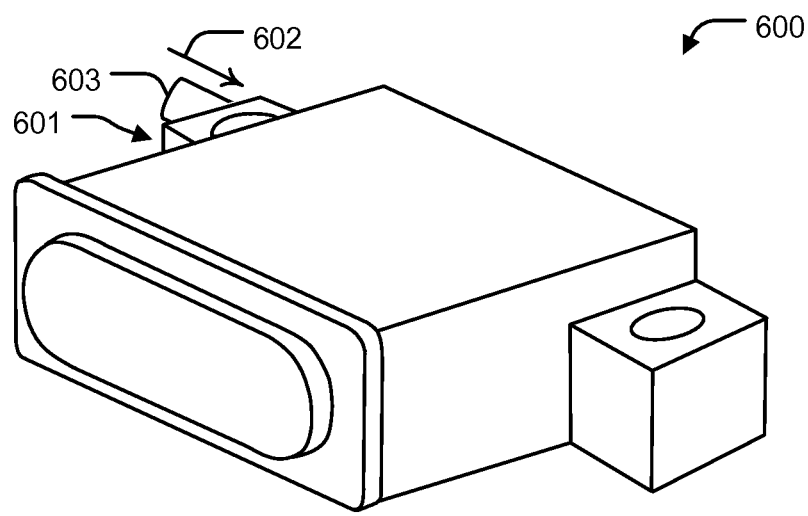
FIG. 6 is a perspective view of a uni-directionally injection molded part, according to an embodiment of the invention.

FIG. 6 is a perspective view of an injection molded part, according to an embodiment of the invention. As illustrated, the part 600 lacks a knit line. Furthermore, the part 600 is formed through a single gate region 603 proximate a primary surface 601 of the part 600 using a single primary flow direction 602. The primary flow direction 602 is the overall flow direction of injected material which formed the part 600, and is opposite direction 502. The primary flow direction 602 may be substantially orthogonal to the primary surface 601, or may be angled therefrom. The gate region 603 may remain attached to the part 600 after removal from a mold (e.g., as a remnant), and may be removed prior to or during machining processes.

Figure 7:
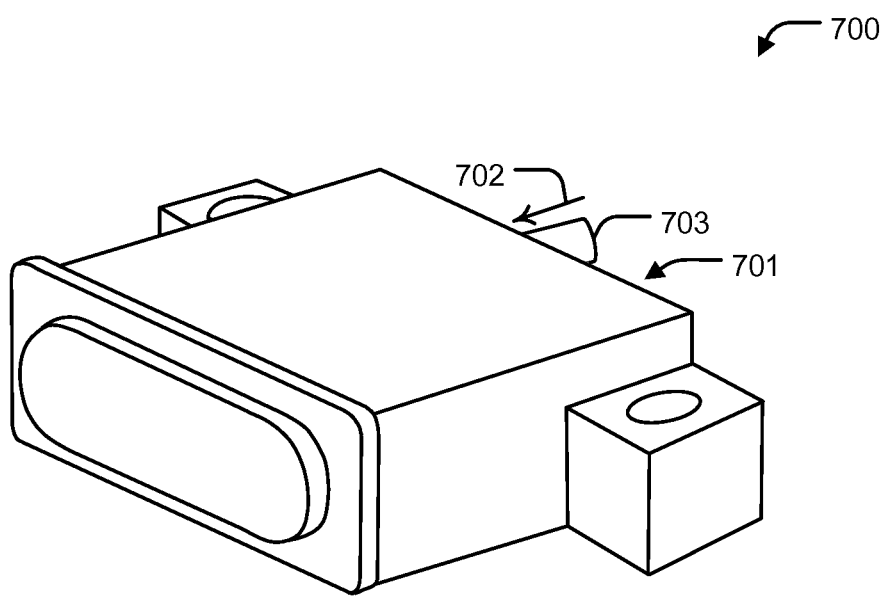
FIG. 7 is a perspective view of a uni-directionally injection molded part, according to an embodiment of the invention.

FIG. 7 is a perspective view of an injection molded part, according to an embodiment of the invention. As illustrated, the part 700 lacks a knit line. Furthermore, the part 700 is formed through a single gate region 703 proximate a primary surface 701 of the part 700 using a single primary flow direction 702. The primary flow direction 702 is the overall flow direction of injected material which formed the part 700, and is opposite direction 402. The primary flow direction 702 may be substantially orthogonal to the primary surface 701, or may be angled therefrom. The gate region 703 may remain attached to the part 700 after removal from a mold (e.g., as a remnant), and may be removed prior to or during machining processes.

As described above, multiple primary flow directions may be chosen according to any desired implementation of the present invention. Differing flow directions from those illustrated are also possible, however, illustration and description of every possible uni-directional flow pattern for all possible injection molded parts is beyond the scope of this disclosure. All equivalents acts or structures modified from the illustrated forms should be considered to be within the scope of this disclosure.

Hereinafter, several example mold configurations according to the teachings provided herein are described with reference to FIGS. 8-9.

Figure 8A:
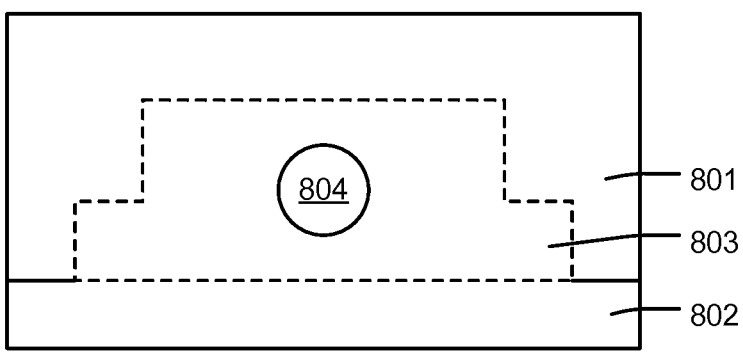
FIG. 8A is an elevation view of a mold for forming a part, according to an embodiment of the invention.
Figure 8B:
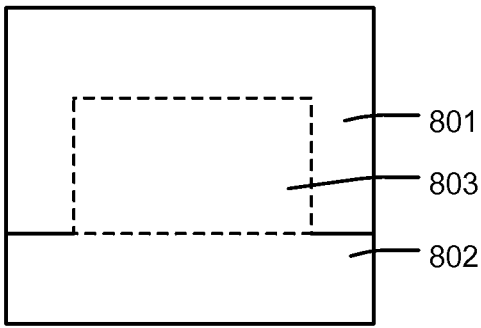
FIG. 8B is a side view of the mold of FIG. 8A.

FIGS. 8A-8B include an elevation view and a side view of a mold 800 for forming a part similar to parts 400 and 700, according to an embodiment of the invention. As shown, the mold 800 may include a first mold portion 801 and a second mold portion 802 defining an internal mold cavity 803. The mold 800 may include a gate region 804 configured to receive and uni-directionally inject material into the mold cavity 803.

Figure 9A:
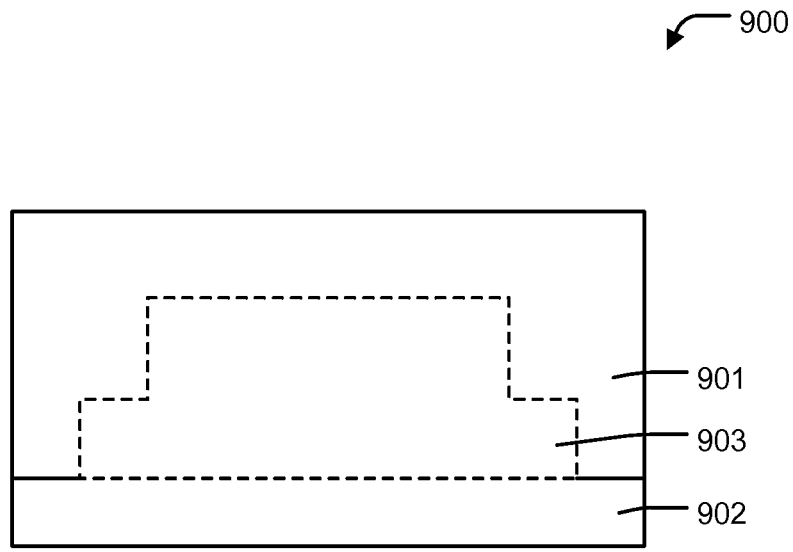
FIG. 9A is an elevation view of a mold for forming a part, according to an embodiment of the invention.
Figure 9B:
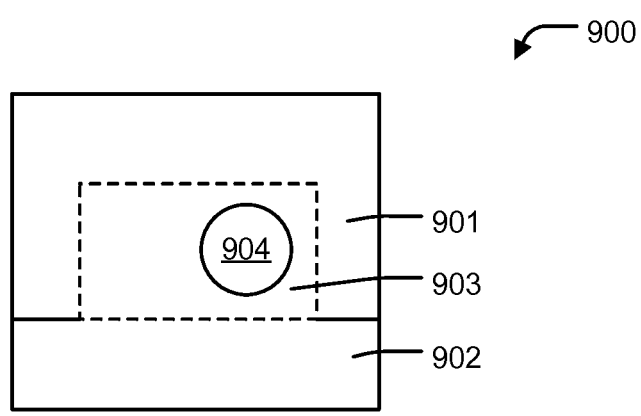
FIG. 9B is a side view of the mold of FIG. 9A.

FIGS. 9A-9B include an elevation view and a side view of an alternate mold 900 for forming a part similar to parts 500 and 600, according to an embodiment of the invention.

As shown, the mold 900 may include a first mold portion 901 and a second mold portion 902 defining an internal mold cavity 903. The mold 900 may include a gate region 904 configured to receive and uni-directionally inject material into the mold cavity 903.

The various aspects, embodiments, implementations or features of the described embodiments can be used separately or in any combination. Various aspects of the described embodiments can be implemented by software, hardware or a combination of hardware and software to control injection molding and fabrication processes as described herein. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of forming a receptacle connector, comprising:
   uni-directionally injecting a mold with material to form a molded part, wherein a primary flow direction of the material during the injecting is substantially parallel to a top surface and a bottom surface of the molded part, and substantially orthogonal to a front surface and a back surface of the molded part;
   removing the molded part from the mold;
   forming a cavity in the molded part by removing a central region of the molded part so as to define an inner surface, wherein the removing forms a front opening within the front surface and a back opening within the back surface, wherein a width of the front opening, as defined in a first direction parallel to the front surface, is greater than a distance in the first direction between the inner surface and the top surface, and greater than a distance in the first direction between the inner surface and the bottom surface; and
   populating the cavity with electrical contacts such that the receptacle connector can electrically connect with a corresponding plug via the front opening or the back opening.

2. The method of claim 1, wherein the molded part includes at least one protrusion that is configured to engage with a fastener.

3. The method of claim 1, further comprising preparing the mold for the uni-directional injecting by performing at least one of:
   cleaning the mold;
   surface treatment of mold surfaces of the mold; and
   assembly of the mold.

4. The method of claim 1, wherein the material includes fibers such that the fibers are oriented substantially parallel to the top surface and the bottom surface and substantially orthogonal to the front surface and the back surface.

5. The method of claim 1, wherein the electrical contacts are configured to severably connect with the corresponding plug.

6. The method of claim 1, wherein the molded part is a seamless part.

7. A method of forming a receptacle connector, comprising:
   forming a molded part by injecting a plastic material through a mold cavity in a primary direction toward a central region of the molded part, the primary direction during the injecting causing fibers within the plastic material to be oriented generally parallel to a top surface and a bottom surface of the molded part, and generally orthogonal to a front surface and back surface of the molded part;
   removing the molded part from the mold cavity;

forming a cavity in the molded part by removing the central region of the molded part so as to define an inner surface, wherein the removing forms a front opening within the front surface and a back opening within the back surface, wherein a width of the front opening, as defined in a first direction parallel to the front surface, is greater than a distance in the first direction between the inner surface and the top surface, and greater than a distance in the first direction between the inner surface and the bottom surface; and assembling an electrical connector within the cavity such that the receptacle connector can be electrically coupled with a corresponding plug via the front opening or the back opening.

8. The method of claim 7, further comprising preparing the mold cavity to receive the plastic material, wherein preparing the mold cavity comprises at least one of:
cleaning the mold cavity; and
surface treatment of mold surfaces of the mold cavity.

9. The method of claim 7, wherein the orientation of the fibers is related to a directional stiffness of the receptacle connector.

10. The method of claim 9, wherein the electrical connector is configured to severably connect with the corresponding plug.

11. The method of claim 7, wherein the molded part is a seamless part.

12. The method of claim 7, wherein injecting the plastic material through the mold cavity comprises:
uni-directionally injecting the plastic material through a single gate region.

13. The method of claim 12, wherein the single gate region is arranged on the front surface or the back surface.

14. The method of claim 7, wherein the plastic material is injected through a single gate region.

15. The method of claim 7, wherein removing the molded part is facilitated by compressed air.

* * * * *